United States Patent [19]
Eustance

[11] 3,836,829
[45] Sept. 17, 1974

[54] POLYOLEFIN FILM CONTAINING THEREIN WIDELY DISPERSED FINE PARTICLES OF A DIELECTRIC LIQUID SOLUBLE MATERIAL

[75] Inventor: John W. Eustance, Glens Falls, N.Y.

[73] Assignee: General Electric Company, Hudson Falls, N.Y.

[22] Filed: Dec. 29, 1969

[21] Appl. No.: 888,233

[52] U.S. Cl................ 317/258, 161/168, 161/169, 252/63.2, 252/64, 252/65, 252/66, 260/2.5 M
[51] Int. Cl......... H01g 1/00, H01g 1/02, H02b 3/18
[58] Field of Search.......... 252/63, 64, 65, 66, 63.2; 260/873, 2.5 M, 896, 897 A; 317/258, 259; 161/162, 169, 170

[56] References Cited
UNITED STATES PATENTS

| | | | |
|---|---|---|---|
| 3,318,655 | 5/1967 | Naka et al. | 260/873 X |
| 3,361,851 | 1/1968 | Gowen | 260/897 |
| 3,363,156 | 1/1968 | Cox | 317/259 |
| 3,367,891 | 2/1968 | Ingram | 260/2.5 |
| 3,431,322 | 3/1969 | Caldwell et al. | 260/873 |
| 3,474,050 | 10/1969 | Chappelear et al. | 260/2.5 |

*Primary Examiner*—Charles E. Van Horn
*Assistant Examiner*—Robert A. Dawson

[57] ABSTRACT

Polyolefin resin has combined therewith, in a widely dispersed manner, discrete fine particles of a material which is readily soluble in a capacitor dielectric liquid impregnant. A capacitor grade dielectric film made from this resin includes the noted particles dispersed therein, so that when the film is impregnated, in a capacitor modification, the fine particles dissolve to pass the dielectric liquid impregnant throughout the film.

9 Claims, 4 Drawing Figures

PATENTED SEP 17 1974  3,836,829
FIG. 1.
FIG. 2.
FIG. 3.
FIG. 4.
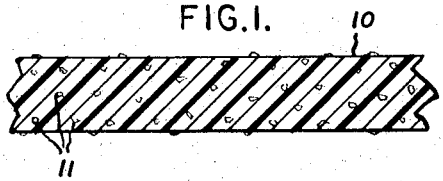
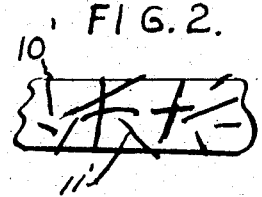
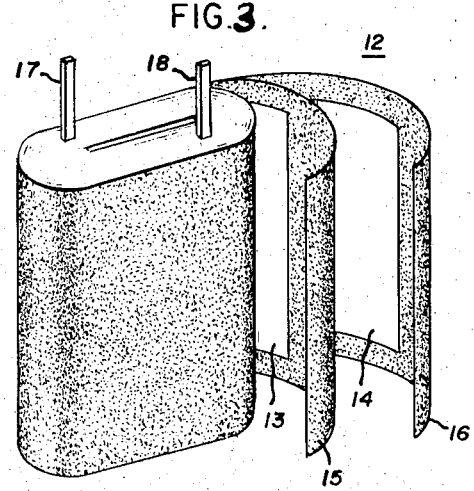
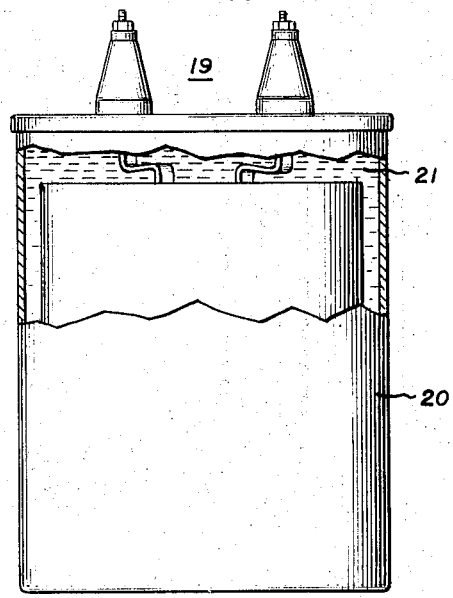
INVENTOR:
JOHN W. EUSTANCE,
BY James J. Lichiello
HIS ATTORNEY.

3,836,829

POLYOLEFIN FILM CONTAINING THEREIN WIDELY DISPERSED FINE PARTICLES OF A DIELECTRIC LIQUID SOLUBLE MATERIAL

BACKGROUND OF THE INVENTION

1. Field of the Invention

This invention relates to a polyolefin film for use as electrical insulation, and more particularly to a capacitor grade polypropylene film having a discrete finely divided material widely dispersed therethrough which is soluble in a capacitor dielectric liquid impregnant.

2. Description of the Prior Art

One of the most significant problems encountered in the use of non-porous synthetic resin films in capacitors, and in roll capacitors particularly, has been the rather impervious nature of the synthetic resins to dielectric liquid impregnants. Because of this impervious nature, it is difficult to impregnate the synthetic resin film or the capacitor roll section to the degree desired. A number of impregnation aids have been disclosed including, for example, the roughening of adjacent film surfaces generally to provide minute passages therebetween, the inclusion of a dielectric liquid impregnant within the synthetic resin from which the film is produced, and also a temperature-time process which permits certain combinations such as, for example, polypropylene and chlorinated diphenyl to be adsorbed one within the other to provide for essentially complete impregnation. One preferred example of the latter method of impregnation is described and claimed in U.S. Pat. No. 3,363,156, Cox, assigned to the same assignee as the present invention.

In the first instance, it is difficult as well as uneconomical to provide roughening of all adjacent film surfaces in a roll capacitor for impregnation purposes. At the same time, roughening of adjacent surfaces has not enjoyed the measure of success in practical applications as would be expected from the principles involved. The temperature-time soluble materials method has limited applicability to predetermined synthetic resins and impregnants. This process requires a careful choice of materials as well as operating parameters to provide the desired results. It has been discovered that certain materials in small particle form may be dispersed within synthetic resin films so that they are dissolved by an impregnant and thereby facilitate progress of the impregnant through the film.

SUMMARY OF THE INVENTION

Accordingly, it is an object of this invention to provide a polyolefin film having widely dispersed therein, discrete fine particles of a material which is soluble in capacitor liquid impregnants.

It is a further object of this invention to provide a polyolefin film having widely dispersed therein discrete fine particles of a chlorinated hydrocarbon soluble material.

It is a further object of this invention to provide a polypropylene film having widely dispersed therein discrete fine particles of a polymer material which is soluble in liquid chlorinated diphenyl.

Briefly described, this invention in one of its preferred forms comprises combining fine particles of a polymer material in polypropylene resin so that a polypropylene film made from the resin includes therein the fine particle polymer in discrete, widely dispersed form. In a roll capacitor, the polypropylene film is impregnated with a chlorinated diphenyl and the fine particles dissolve to facilitate the passage of chlorinated diphenyl throughout the capacitor roll.

BRIEF DESCRIPTION OF THE DRAWINGS

This invention will be better understood when taken in connection with the following description and the drawings in which:

FIG. 1 is a cross sectional and exaggerated view of the film of this invention illustrating the discrete fine particles widely dispersed therethrough.

FIG. 2 is a modification of the fine particles of FIG. 1.

FIG. 3 is an exemplary capacitor roll utilizing the film of FIG. 1.

FIG. 4 is an exemplary encased, impregnated capacitor incorporating the roll section of FIG. 3.

DESCRIPTION OF THE PREFERRED EMBODIMENTS

Referring now to FIG. 1, there is illustrated in a partial and cross sectional view, a strip of a synthetic resin film 10 having widely dispersed therethrough discrete fine particles 11 of an impregnant soluble material. The particles 11 are combined with the synthetic film resin, usually within the resin per se, or as a mixture with preformed resin. Ordinarily, synthetic resin films are produced from a resin by means of a high temperature extrusion process, and therefore the material selected for the fine particles 11 of this invention must be stable at those temperatures ordinarily utilized to produce the film. After film 10 is produced from the resin containing the fine particles 11, the film will appear generally as illustrated in FIG. 1. In FIG. 1, discrete fine particles 11 are shown as randomly and uniformly distributed throughout the film 10, and also as embedded in or slightly project from the strip surface as surface oriented particles.

Two advantages are noted from the inclusion of fine particles 11 in film 10. First of these advantages is the fact that the fine particles 11 which will be found scattered or dispersed on the external surfaces of the film 10, or slightly embedded in the external surfaces of the film, provides film 10 with a roughened or irregular surface. Adjacent films or adjacent surfaces, where at least one of the surfaces is so roughened, will provide more favorable impregnation characteristics much in the same manner as provided by the aforementioned roughening of adjacent film surfaces and as described in U.S. Pat. No. 3,340,446, Cox, where aluminum oxide particles are embedded in a film surface.

The second advantage inherently included in the fine particle dispersion within film 10 is the ease in which a liquid impregnant may pass through the film and into the film by means of the fine particles dissolving in the impregnant and thereby facilitating the passage of the impregnant within the film. Ordinarily, synthetic resin films are permeable to dielectric liquid impregnants only to a slight degree, particularly at lower temperatures. One of the effects of the fine particle dispersion is to reduce the distance in the film material through which the impregnant must pass before reaching a soluble material particle which then acts as a new source or channel for the impregnant to proceed to the next particle. These particles effectively break up a given film thickness to a chain of smaller thicknesses, and the reduced or individual thicknesses between particles are well within the scope of thicknesses which are easily impregnated by the impregnant at more moderate temperatures.

Where the film is a polyolefin, for example polypropylene, and the impregnant is a chlorinated diphenyl, the existence of the particles provide a much more rapid impregnation of the film. For example, ths surface roughness caused by the fine particles provides some passage between surfaces through which the impregnant may pass. At the same time these particles swell when adsorbing the impregnant, thereby providing both an enlarged area and some motion to increase the flow of impregnant into the film.

The material selected for the fine particles 11 must be, in a broad sense, a material which is dissolved by a dielectric liquid impregnant which is to be utilized. At the same time the material must be compatible not only with the impregnant but also with the host film. For a capacitor grade film the fine particles 11 must have those dielectric and electrical properties which approach or are quite similar to the same properties of the host film. Where the host film is a polyolefin material and the dielectric liquid impregnant is a liquid hydrocarbon, the fine particles 11 may comprise a number of polymers including, for example, the polycarbonates, such as Lexan* (Trademark, General Electric Co.) polycarbonate, polysulfones, and polyphenylene oxides, singly or in combination. More particularly, excellent results have been obtained in the practice of this invention when the host film was polypropylene and the fine particle polymer included one or more of polyphenylene oxide, polycarbonate, or polysulfone.

It is desirable that the particles be compatible with the host film so that a good bond therebetween is obtained. In this respect the particles may be suitably coated with other bonding materials, including favorable wetting materials which facilitate passage of the impregnant by the interface. Furthermore, appropriate heat treatment may be provided for film 10 to improve the bonding characteristics or size characteristics of the particles in the film.

It is preferred that the size of the individual fine particles be retained within certain limits. For example, it is preferred to have the maximum diameter of a fine particle to be significantly less than the thickness of the host film, and preferably less than one-half the thickness of the host film. It is desirable to avoid too many fine particles of such large size that their incorporation within the host film would provide single path through the host film comprising only the fine particle material. Whereas a single path through the material may also be defined by two or more fine particles in adjacent relationship, this path is usually of a tortuous nature, very small, and the solubility of the material therein will not leave an unfilled passage through the film 10. Good results have been obtained in the practice of this invention where film 10 thickness was 0.0005 inch and the fine particles were of 325 mesh size for polyphenylene oxide and polycarbonate and 100 mesh size for polysulfone.

The shape of the particles 11 is not particularly critical since they are usually of a blocky, e.g., a somewhat rounded or spheroidal, shape. Where the spheroidal shape is not applicable, the larger diameter of the fine particles should be restricted to less than about one-half of the thickness of the host film, or otherwise some preferred orientation is necessary so that the fine particles in their longer dimensions lie approximately parallel with the longitudinal axis of the film.

In this connection the fine particles may take the form of short rods or needles as illustrated in FIG. 2. In FIG. 2, the film 10' has incorporated therein fine particles in the form of short rod like elements 11'. Polymer fibers are available in sizes approaching 0.0001 inch diameter. Very short lengths of these fibers may be incorporated in the synthetic resin from which film is produced, either in oriented or randomly oriented relationship. Many of these short rods will project, internally from one film surface to the other and serve as channels through which the impregnant may flow. Other rods will serve to introduce the impregnant internally in the film to the other rods. Cooperatively, these dissolving rods will provide channel means to distribute the impregnant into and through the film.

The incorporation of fine particles in a film 10 affects the heat shrink characteristics of the film where the characteristics are different for the different materials. Particularly, the rods 11' tend to restrain the film or minimize the degree of heat shrinking which would otherwise be expected. However, if the rods 11' have greater heat shrinking tendencies, a film may be produced which has localized crinkling areas over its surface.

In one practice of this invention, powder mix was prepared including polypropylene resin together with 0.5 percent by weight of polyphenylene oxide. Other mixes in the same proportions of constituents were prepared for each of polycarbonate and polysulfone. Particle sizes were 325 mesh for polyphenylene oxide and 100 mesh for polysulfone. Sheets of film of 0.018 inch thickness were prepared from these mixes by compression molding at about 210°C. Examination indicated the filler particles to be randomly dispersed throughout the sheets in discrete particles.

The film of this invention may be used in various capacitor modifications including those illustrated in the aforementioned Cox U.S. Pat. No. 3,363,156. More particularly, the film of this invention is wound in a roll capacitor configuration as illustrated in FIG. 3. Referring now to FIG. 3, the roll capacitor section 12 comprises wound alternate layers of metal foils 13 and 14 and synthetic resin dielectric sheets 15 and 16. Metal foils 13 and 14 serve as the capacitor electrodes and may be composed of various capacitor electrode metals, but are usually aluminum. Electrical contact is made with electrodes 13 and 14 by means of tap straps 17 and 18 which are suitably connected to the electrodes 13 and 14, and project from an end of the wound capacitor section. In accordance with the present invention, the synthetic resin film sheets 15 and 16 are modified by the use of the film 10 of FIG. 1 of this invention.

One or more of the rolls of FIG. 1 are included in a casing structure to provide an impregnated cased capacitor. For example, in FIG. 4 capacitor 19 includes a casing 20 incorporating the roll section 12 of FIG. 3 therein, and is surrounded by a suitable impregnant 21. The capacitor 19 of FIG. 4 may be referred to as a small industrial capacitor and the roll section may utilize a single sheet only of a dielectric material between the electrode foils.

In many capacitor modifications there may be a plurality of synthetic dielectric sheets 10 between capacitor electrodes in contiguous relationship and in separated relationship. The separated relationship is accomplished by means of a spacer strip which may separate groups of strips or a single strip. The film 10 of this invention is therefore applicable in a dual nature in that it may be utilized as a spacer or wicking strip only in a capacitor or as the only kind of dielectric strip employed.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed as new and desired to be secured by Letters Patent of the United States is:

1. A dielectric material specifically adapted to be impregnated with a dielectric liquid hydrocarbon for use as electrical insulation in electrical apparatus comprising, in combination
   a. a solid synthetic resin polyolefin film and
   b. fine particle polymer filler material randomly dispersed throughout said film in discrete fine particle form
   c. said particles having a higher melting temperature than said film
   d. each of said filler material and said film being soluble in said liquid under the same conditions with said particles being more soluble therein than said film.

2. The invention as recited in claim 1 wherein said resin film is polypropylene and said filler material is selected from the group consisting essentially of polycarbonates, polysulfones, and polyphenylene oxides.

3. The invention as recited in claim 2 wherein said particles are rod like in shape.

4. The invention as recited in claim 3 wherein said rods are of random lengths ranging from lengths less than the thickness of said film to lengths greater than the thickness of said film.

5. The invention as recited in claim 2 wherein said polymer particles occupy from about 0.5 to about 30 percent by volume of said film.

6. The invention as recited in claim 5 wherein said polymer particles are of an average diameter which is less than about one-half the thickness of said film and the maximum diameter is less than the thickness of said film.

7. In an electrical capacitor utilizing polypropylene film as a dielectric, and subject to impregnation with a liquid hydrocarbon impregnant, the improvement of
   a. the said polypropylene having widely dispersed therein between 0.5 and 30 percent by volume of a further polymer in discrete fine particle form
   b. the average diameter of said particles being less than the thickness of said film
   c. the fine particles being readily soluble in said liquid hydrocarbon during impregnation of said capacitor
   d. the said particles having a softening temperature greater than that of said polypropylene film.

8. A method of impregnating the capacitor of claim 7 comprising
   a. assembling a capacitor roll section utilizing said improved polypropylene film
   b. inserting said roll section in a casing
   c. filling said casing with a liquid hydrocarbon
   d. and subjecting said capacitor to an elevated temperature sufficient for said liquid hydrocarbon to permeate said film and dissolve said particles.

9. The invention as recited in claim 8 wherein said liquid hydrocarbon is a chlorinated diphenyl.

* * * * *